(12) United States Patent
Buquet et al.

(10) Patent No.: US 7,708,500 B2
(45) Date of Patent: May 4, 2010

(54) RESIN ANCHOR WITH A COMPRESSIBLE ENVELOPE CONTAINING A CURABLE PRODUCT

(75) Inventors: Barbara Buquet, Valence (FR); Gilles Caille, Paris (FR); Alain Gauthier, Saint-Jean-de-Muzols (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 11 days.

(21) Appl. No.: 12/159,644

(22) PCT Filed: Jan. 8, 2007

(86) PCT No.: PCT/IB2007/000039

§ 371 (c)(1),
(2), (4) Date: Jun. 30, 2008

(87) PCT Pub. No.: WO2007/080478

PCT Pub. Date: Jul. 19, 2007

(65) Prior Publication Data

US 2008/0304920 A1 Dec. 11, 2008

(30) Foreign Application Priority Data

Jan. 13, 2006 (FR) ................... 06 00348

(51) Int. Cl.
*E21D 20/00* (2006.01)
(52) U.S. Cl. .................. 405/259.6; 405/259.5; 411/82.3
(58) Field of Classification Search .............. 405/259.5, 405/259.6, 259.1, 259.2; 411/82.3, 82.2
See application file for complete search history.

(56) References Cited

U.S. PATENT DOCUMENTS

| | | | |
|---|---|---|---|
| 3,702,060 A | 11/1972 | Cumming | |
| 3,877,235 A * | 4/1975 | Hill | 405/259.6 |
| 4,051,681 A | 10/1977 | Yaros | |
| 4,224,971 A | 9/1980 | Muller et al. | |
| 4,263,832 A * | 4/1981 | Lang et al. | 405/259.6 |
| 4,322,183 A * | 3/1982 | Ciavatta | 405/259.6 |
| 4,326,632 A | 4/1982 | Koob | |
| 4,343,399 A * | 8/1982 | Patel et al. | 405/259.6 |
| 4,490,074 A * | 12/1984 | Chaiko | 405/259.6 |

(Continued)

FOREIGN PATENT DOCUMENTS

DE 3200051 A1 7/1983

(Continued)

OTHER PUBLICATIONS

ISR for PCT/IB2007/000039 dated Apr. 20, 2007.

*Primary Examiner*—Frederick L Lagman
(74) *Attorney, Agent, or Firm*—Lowe Hauptman Ham & Berner LLP

(57) ABSTRACT

The resin anchor comprises an apertured tubular envelope designed to be compressed by a traction element, characterized in that it includes, on the inside of the envelope, a resin component and a hardener component that are intended to be mixed together and to cure under the action of the compression of the envelope, in order to fasten the anchor. The traction element is a stud having a threaded rod part that cooperates with a tapped traction element firmly attached to the end of the bushing. The anchor is fastened both mechanically and chemically, for either solid material or hollow material.

16 Claims, 2 Drawing Sheets

U.S. PATENT DOCUMENTS

| | | | |
|---|---|---|---|
| 4,820,095 A | * | 4/1989 | Mraz ........................ 405/259.6 |
| 4,976,571 A | * | 12/1990 | Mraz et al. ................ 405/259.6 |
| 5,013,192 A | * | 5/1991 | Scott ........................ 405/259.6 |
| 5,104,266 A | * | 4/1992 | Daryoush et al. ......... 405/259.5 |
| 5,562,377 A | * | 10/1996 | Giannuzzi et al. ......... 405/259.5 |
| 5,725,341 A | * | 3/1998 | Hofmeister ................ 411/82.3 |
| 5,730,557 A | * | 3/1998 | Skupien et al. ........... 405/259.6 |
| 5,953,879 A | * | 9/1999 | Fischer et al. ............. 405/259.6 |
| 6,705,804 B2 | * | 3/2004 | Dierker .................... 405/259.5 |
| 6,837,018 B1 | * | 1/2005 | Hagel et al. ............... 405/259.5 |

FOREIGN PATENT DOCUMENTS

| | | |
|---|---|---|
| DE | 3304071 A1 | 8/1984 |
| FR | 2444070 | 7/1980 |
| FR | 2517363 | 6/1983 |

* cited by examiner

RESIN ANCHOR WITH A COMPRESSIBLE ENVELOPE CONTAINING A CURABLE PRODUCT

RELATED APPLICATIONS

The present application is based on International Application Number PCT/IB2007/000039 filed Jan. 8, 2007, and claims priority from French Application Number 06 00348 filed Jan. 13, 2006, the disclosures of which are hereby incorporated by reference herein in their entirety.

The present invention relates to resin anchors, that is to say anchors that are fastened to a support material by means of resin and a hardener for curing the resin.

Resin anchors exist for solid materials and for hollow materials.

In a solid material, a hole may be drilled and a resin capsule, in which a stick of hardener is embedded, may be slipped thereinto, before the combination is crushed and the two components mixed together. It is also possible to drill a hole and inject resin and a hardener thereinto, the resin and hardener mixing together. A threaded rod or a screw may serve as fastening element.

In a hollow material, after a hole has been drilled in the wall of the material, a tubular screen may be introduced into said hole, resin and a hardener then being injected into said screen, and the resin, expelled out of the screen and after curing, fastening the screen to the rear of the wall. Threaded rod and screw may also be used as fastening elements.

All the abovementioned anchors may be used both in a solid material and in a hollow material.

Also known, for a hollow material, is an element with a bearing flange to which a slit skirt is firmly attached, the skirt being designed i) to be pressed against the rear face of the wall through the action of the tie connecting it to the flange that bears against the front face of the wall and ii) to receive, by injection, a resin/hardener mix for fastening the element to the rear of the wall.

All the abovementioned anchors, which have been known for a long time, are fastened by purely chemical means.

Many of these resin anchors require a resin injection step to be carried out, and the Applicant has sought to dispense with this relatively tedious injection operation. In addition, the Applicant has sought to provide a resin anchor that is not only suitable both for a hollow material and a solid material but that is able to be fastened no longer by purely chemical means but also by mechanical means.

Thus, what it proposes is a resin anchor comprising an apertured tubular envelope designed to be compressed by a traction element, characterized in that it includes, on the inside of the envelope, a resin component and a hardener component that are intended to be mixed together and to cure under the action of the compression of the envelope, in order to fasten the anchor.

It should be emphasized that nothing could have encouraged a person skilled in the art to put, into a resin anchor also having mechanical fastening, thanks to the compression of the compressible envelope, and usable both in a hollow material and a solid material, two components intended to be cured as was done in a hole of a solid material for receiving a fastening element of the threaded rod or tapped bushing type.

Preferably, a tubular sleeve of the two curable components is provided, again preferably placed around the traction element.

Advantageously, the anchor includes an external sleeving for retaining the cure components.

In a first embodiment, the two cure components extend along the sleeve in the form of a sheet of one of the components and in the form of a helix of the other component. There could also be a double sleeve comprising two sheets of the two respective components.

In a second embodiment, the sleeve is a sheet that supports bubbles containing one of the two cure components, the other of the two components coating the traction element, and the sheet being wound around the traction element.

In a third embodiment, the sleeve is a sheet supporting bubbles of the two respective cure components, the sheet being wound around the traction element.

The invention will be more clearly understood with the aid of the following description of several embodiments of the anchor, with reference to the appended drawing in which.

Figure 1:
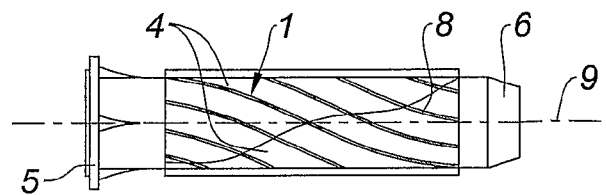
FIG. 1 is a side view of the anchor of the invention.
Figure 2:
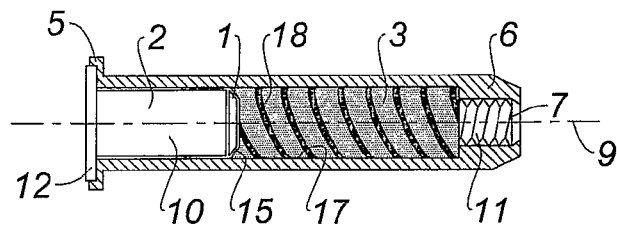
FIG. 2 is a view partly in axial section of the first embodiment of the anchor of the invention, with one cure component in the form of a helix.
Figure 3:
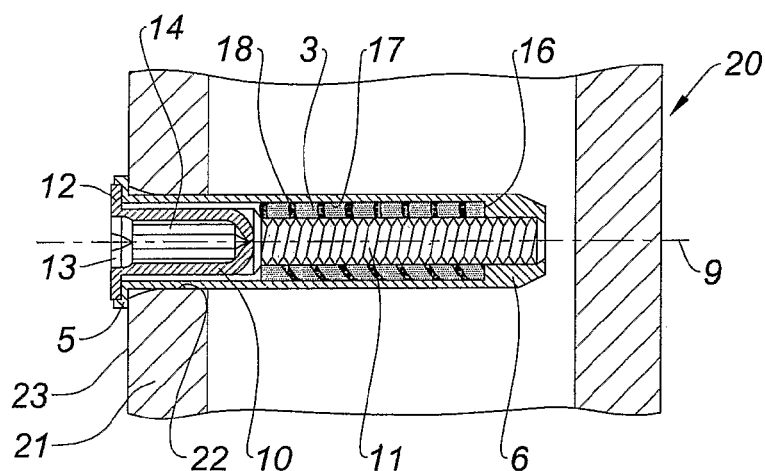
FIG. 3 is a view in axial section of the anchor of FIG. 2, fitted in an outer wall of a hollow material, before fastening.
Figure 4:
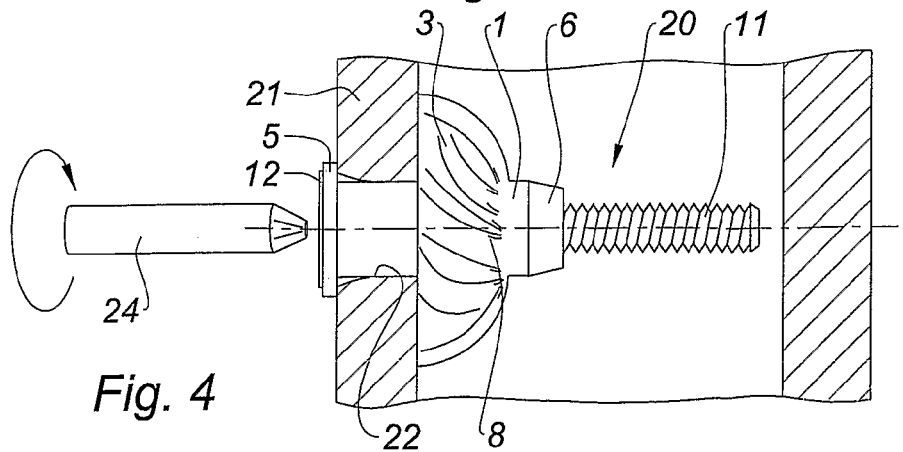
FIG. 4 is a view in axial section of the anchor of FIG. 3, after fastening.

With reference to FIGS. 1-4 relating to the first embodiment, the anchor comprises a bushing 1, here made of plastic, of axis 9, a stud 2, enveloped in the bushing 1, a curable sleeve 3, around the stud 2 and placed between the stud and the bushing, and a retention sleeving 4 around the bushing.

The bushing 1 extends between a bearing flange 5 and another end 6 on the opposite side from that of the flange and bearing a traction nut 7, as will be explained later.

The tubular envelope of the bushing is apertured by helical slits 8 extending over most of the axial length of the bushing, between the two ends 5, 6.

The stud 2 has, along its axis 9, a hollow part 10 and a solid part 11. The hollow part is a small tubular element 10 provided with a flange 12 that bears on the flange 5 of the bushing. This tubular element 10 has an entrance 13 shaped, substantially in the plane of its flange 12, so that a screwdriver or other screwing bit can engage therein. The hollowed part 14 of the tubular element of the stud 2 is designed to receive a screw or other bolt for fastening a component.

The solid part 11 of the stud is a threaded rod element screwed into the nut 7 on the end 6 of the bushing 1. It will be understood that, when the stud 2 is being screwed into the nut 7, while the flange 12 bears against the flange 5, the end 6 of the bushing is drawn towards the flanges, that is to say the apertured tubular envelope of the bushing is compressed. This is why the stud 2 is called the traction element. The nut 7 is also a traction nut, just like the end 6 of the bushing.

It should be noted that it would be possible to dispense with the nut 7, or tapped traction element attached to the end 6 of the bushing, if the end 6 of the bushing were itself tapped like the screw.

The inside diameter of the envelope of the bushing 1, that is to say the diameter of the internal bore 17 of the bushing 1, corresponds very substantially to the outside diameter of the hollowed part 14 of the stud 2. It is very slightly greater than it. The envelope of the bushing extends with such an inside diameter as far as its traction end 6.

The outside diameter of the threaded rod part 11 of the stud 2 is smaller than that of the hollowed part 14 so that, between the shoulder 15, made between the two parts of the stud 10, 11 of different diameters, and the far end 16 of the internal bore 17 of the bushing 1, the curable tubular sleeve 3 may be housed around the threaded rod part 11 of the stud 2. The sleeve 3 is a sleeve consisting of two curable components, in this case resin and a hardener. In the case illustrated in FIGS. 2-4, the sleeve 3 is made from a sheet of one of the two components (resin or hardener) which is striped with inclined lines of the other component (hardener or resin) before the sheet is rolled up so as to be closed on itself and then slipped around the threaded rod part 11 of the stud 2 in order to obtain the sleeve 3 of one of the two components coated with a helix 18 of the other component.

As a variant of this first embodiment, the sleeve of curable components could be obtained from two sheets of the two components, with the same dimensions, placed one on top of the other, before being rolled up together and closed up on themselves.

Having described the resin anchor in terms of its various elements, we will now deal with its use, here in a hollow material 20 with an outer wall 21.

After a hole 22 has been drilled into the wall 21 with a diameter very slightly larger than the outside diameter of the envelope of the bushing 1, the anchor is introduced into the hole 22 as far as the point when the flange 5 of the bushing bears against the external surface 23 of the wall 21. The stud 2 is then rotated, using a screwdriver or screwing device with a screwing bit 24 placed in its entrance. The traction end 6 of the bushing 1 is pulled back along the threaded rod part 11 of the stud 2, thereby compressing the envelope of the bushing 1, causing it to expand, and creating a "lump" at the rear of the wall 21, so as already to mechanically fasten the anchor to the wall 21.

Concomitantly, the compression of envelope causes the sleeve 3 to be kneaded and the two components to be mixed together, which mix, during compression of the envelope of the bushing, is partly expelled via the slits 8 in order to form, at the rear of the wall 21, a substance that will cure in order to achieve, by chemical means, perfect fastening of the anchor to the wall 21. Thanks to the retention sleeving 4, which is here heat-sealed and extensible, the resin does not flow away, it being retained by the sleeving.

The embodiments shown in FIGS. 5-8 differ from the embodiment shown in FIGS. 1-4 only by the curable sleeve, all the other elements being identical.

Figure 5:
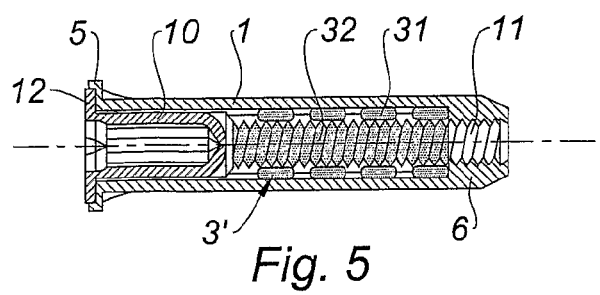
FIG. 5 is a view in axial section of the second embodiment of the anchor of the invention with a sheet supporting one of the two cure components, the sheet being wound around the traction element coated with the second component.
Figure 6:
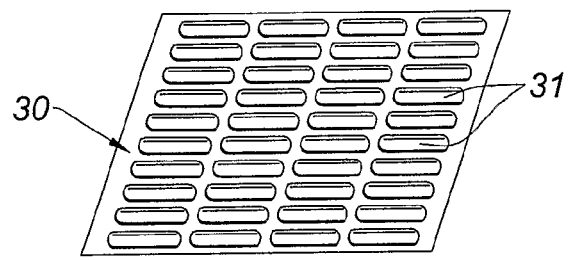
FIG. 6 is a view of the sheet supporting the cure component of the anchor of FIG. 5.

In the embodiment shown in FIGS. 5, 6, the curable sleeve 3' is made from an inert support sheet 30 comprising, embedded in it, a matrix of bubbles or capsules 31 of one of the two components (resin or hardener), the part of the threaded rod 11 of the stud 2 being coated (32) with the second component over the portion of its length extending as far as the far end 16 of the envelope 1 of the bushing. The sheet is then rolled up so as to be closed on itself, in order to form a curable tubular sleeve 3' which is then slipped around the threaded rod part 11 of the stud 2 of the anchor.

When the envelope of the bushing is being compressed, the capsules 31 are pierced, causing the component in the capsules to be mixed with the component coating the threaded rod part 11, before they cure.

Figure 7:
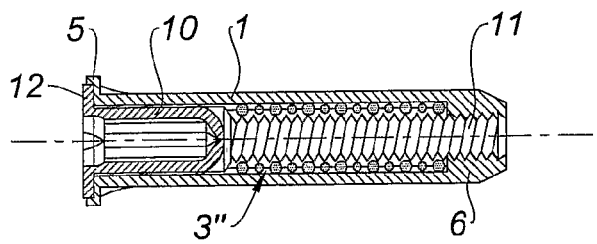
FIG. 7 is a view in axial section of the third embodiment of the anchor of the invention, with a sheet supporting both cure components and being wound around the traction element.
Figure 8:
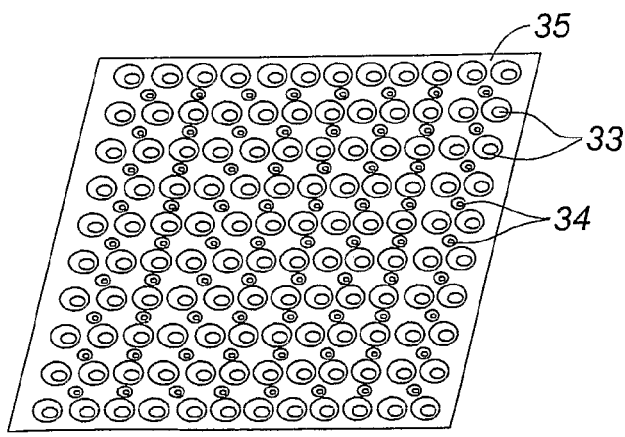
FIG. 8 is a view of the sheet supporting both cure components of the anchor of FIG. 7.

The curable sleeve 3" of the embodiment shown in FIGS. 7, 8 of the resin anchor of the invention is very slightly different from the previous one. It is made from an inert support sheet 35 embedded in which are two mutually imbricated matrices of capsules or bubbles 33 of the first component (resin or hardener) and capsules or bubbles 34 of the other component. The sheet is then rolled up so as to be closed on itself, in order to form a curable tubular sleeve 3" which is then slipped around the threaded rod part 11 of the stud 2 of the anchor.

During the compression, all the capsules 33, 34 are punctured before the components mix and cure.

Instead of capsules, microcapsules may be provided.

The invention claimed is:

1. A resin anchor, comprising:
an apertured tubular envelope adapted to be compressed by a traction element,
wherein said resin anchor further includes, on an inside of the envelope, a resin component and a hardener component adapted to be mixed together and to cure under the compression of the envelope to fasten the anchor, and
wherein the resin component and the hardener component are in the form of a sheet of one of the components, which is rolled up so as to be closed on itself to define a tubular sleeve, and of a helix of the other component.

2. An anchor, comprising:
a bushing which includes helical slits rendering said bushing axially compressible, and
on an inner side of said bushing, a resin component and a hardener component adapted to be mixed together, when the bushing is axially compressed, and to cure to fasten the anchor.

3. The anchor according to claim 2, further comprising a traction element adapted to axially compress said bushing.

4. The anchor according to claim 3, wherein the traction element has a threaded rod engageable with a traction nut at one end of the bushing for pulling said end toward an opposite end of the bushing for axially compressing said bushing.

5. The anchor according to claim 3, comprising a tubular sleeve that comprises at least one of the resin and hardener components and surrounds the traction element.

6. The anchor according to claim 2, further comprising an external sleeving positioned around an outer side of the bushing for retaining the resin and hardener components and preventing the components from flowing away through the slits when the bushing is axially compressed.

7. The anchor according to claim 2, wherein one of the resin and hardener components is in the form of a sheet, which is rolled up to define a tubular sleeve, and the other of the resin and hardener components is in the form of a helix on said sheet.

8. The anchor according to claim 2, wherein the resin and hardener components are in the form of two sheets, respectively, said sheets being rolled up together to define a tubular sleeve.

9. The anchor according to claim 4, further comprising:
an inert support sheet being rolled up so as to define a tubular sleeve around the traction element;
wherein
one of the resin and hardener components is in the form of capsules embedded in the sheet, and
the other of the resin and hardener components is a coating on the traction element.

10. The anchor according to claim 2, further comprising:
an inert support sheet being rolled up so as to define a tubular sleeve;
wherein the resin and hardener components are embedded in the sheet in the form of capsules or microcapsules of the two components, respectively.

11. An anchor, comprising:
a stud having a head and a threaded rod;
a bushing surrounding and being adapted to be axially compressed by said stud; and
a tubular sleeve between the bushing and the stud,
wherein said bushing has
 a flange on which the head of the stud rests;
 an enlarged end portion opposite to the flange and threadedly engageable with the threaded rod of the stud; and
 a middle portion arranged between the flange and the enlarged end portion and being thinner than said enlarged end portion,
wherein
said tubular sleeve directly rests on an end surface of the enlarged end portion, and extends along the middle portion axially of the bushing, and
said tubular sleeve has a resin component and a hardener component adapted to be mixed together, when the enlarged end portion is pulled axially by the stud toward the flange thereby compressing the middle portion, and to cure to fasten the anchor.

12. The anchor according to claim 11, further comprising an external sleeving positioned around an outer side of the bushing for retaining the resin and hardener components and preventing the components from flowing away when the bushing is axially compressed.

13. The anchor according to claim 11, wherein one of the resin and hardener components is in the form of a sheet, which is rolled up to define the tubular sleeve, and the other of the resin and hardener components is in the form of a helix on said sheet.

14. The anchor according to claim 11, wherein the resin and hardener components are in the form of two sheets, respectively, said sheets being rolled up together to define the tubular sleeve.

15. The anchor according to claim 11, wherein
the tubular sleeve is defined by an inert support sheet being rolled up so as to be closed on itself;
one of the resin and hardener components is in the form of capsules embedded in the sheet, and
the other of the resin and hardener components is a coating on the stud.

16. The anchor according to claim 11, wherein
the tubular sleeve is defined by an inert support sheet being rolled up so as to be closed on itself;
wherein the resin and hardener components are embedded in the sheet in the form of capsules or microcapsules of the two components, respectively.

\* \* \* \* \*